United States Patent [19]
Viot

[11] Patent Number: 5,787,407
[45] Date of Patent: Jul. 28, 1998

[54] DATA PROCESSING SYSTEM FOR EVALUATING FUZZY LOGIC RULES AND METHOD THEREFOR

[75] Inventor: J. Greg Viot, Austin, Tex.

[73] Assignee: Motorola Inc., Schaumburg, Ill.

[21] Appl. No.: 971,266

[22] Filed: Nov. 17, 1997

Related U.S. Application Data

[63] Continuation of Ser. No. 363,434, Dec. 22, 1994, abandoned.

[51] Int. Cl.$^6$ ............................................. G06F 15/18
[52] U.S. Cl. .............................. 706/8; 706/1; 706/10
[58] Field of Search ............................. 395/3, 10, 11, 395/900, 51

[56] References Cited

U.S. PATENT DOCUMENTS

| | | | |
|---|---|---|---|
| 5,263,125 | 11/1993 | Viot et al. | 395/51 |
| 5,295,229 | 3/1994 | Viot et al. | 395/51 |
| 5,335,314 | 8/1994 | Tsutsumi et al. | 395/3 |
| 5,376,752 | 12/1994 | Limberis et al. | 84/622 |
| 5,386,271 | 1/1995 | Kazunobu | 355/204 |
| 5,684,928 | 11/1997 | Viot et al. | 395/3 |

FOREIGN PATENT DOCUMENTS 373628  6/1990  European Pat. Off. .......... G06F 9/44

*Primary Examiner*—Tariq R. Hafiz
*Attorney, Agent, or Firm*—Paul J. Polansky

[57] ABSTRACT

A data processing system (10) selectively weights a fuzzy logic rule in response to a single "REVW" software instruction. In response to the REVW instruction, the data processing system (10) fetches a set of fuzzy inputs associated with the fuzzy logic rule, and determines a minimum fuzzy input from the set. The data processing system (10) then selectively weights the minimum fuzzy input to provide a fuzzy output of the fuzzy logic rule, by multiplying the minimum fuzzy input by a corresponding weight. In one embodiment, a carry bit in a condition code register (60) determines whether the fuzzy logic rule is to be weighted. In response to the single REVW instruction, the data processing system (10) further performs this selective fuzzy rule weighting operation for all rules in a fuzzy rule base.

34 Claims, 5 Drawing Sheets

DATA PROCESSING SYSTEM FOR EVALUATING FUZZY LOGIC RULES AND METHOD THEREFOR

This application is a continuation of prior patent application Ser. No. 08/363,434 filed Dec. 22, 1994 now abandoned.

CROSS REFERENCE TO RELATED APPLICATION

This application is related to a copending patent application filed concurrently herewith and entitled:

"DATA PROCESSING SYSTEM FOR PERFORMING EFFICIENT FUZZY LOGIC OPERATIONS AND METHOD THEREFOR" by J. Greg Viot, Attorney Docket Number SC-02387A, Ser. No. 08/363,196, now U.S. Pat. No. 5,671,332, issued Sep. 23, 1997.

FIELD OF THE INVENTION

This invention relates generally to data processing systems, and more particularly to a data processing system for performing fuzzy logic operations.

BACKGROUND OF THE INVENTION

Data processors have been developed to function as binary machines whose inputs and outputs are interpreted as ones or zeroes, and no other possibilities may exist. While this works well in most situations, sometimes an answer is not simply "yes" or "no," but somewhere in between. A concept referred to as "fuzzy logic" was developed to enable data processors based on binary logic to provide an answer between "yes" and "no."

Fuzzy logic is a logic system which has membership functions with fuzzy boundaries. Membership functions translate subjective expressions, such as "a temperature is warm," into a value which typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, if a range of temperatures provide the membership functions, an input temperature may fall in the overlapping areas of both the functions labeled "cool" and "warm." Further processing would then be required to determine a degree of membership in each of the membership functions (i.e. the degree to which the current temperature fits into each of the membership sets cool and warm).

A step referred to as "fuzzification" is used to relate an input to a membership function in a system which implements fuzzy logic. The fuzzification process attaches concrete numerical values to subjective expressions such as "the temperature is warm." These numerical values attempt to provide a good approximation of human perception.

After the fuzzification step, a step referred to as rule evaluation is executed. During the rule evaluation step, rule expressions that depend on fuzzy input values are evaluated to derive fuzzy outputs. For example, assume a rule to be evaluated may be stated as:

If (Temperature is warm) and (Pressure is high), then (Fan speed is medium).

In this rule, two antecedents, "Temperature is warm" and "Pressure is high" must be evaluated to determine a rule strength of the consequence, "Fan speed is medium." During the rule evaluation step, the degree to which an antecedent is true affects the degree to which the rule is true. The minimum of the antecedents is applied as the rule strength of the consequence of the rule. Therefore, if more than one rule is evaluated, and the fan is given more than one instruction, the rule strengths of the consequences of each of the rules are collectively used to determine an action of the fan. For example, the rule provided above may be evaluated to have a rule strength of X. Additionally, a second rule is evaluated to turn the fan on at a high speed with a rule strength of Y, where Y is greater than X. Additionally, each of the rules may be weighted, if desired. Multiplying the antecedents by selected weights provides desired emphasis on selected rules.

A last step in a fuzzy logic operation is to provide an appropriate action in response to the fuzzy outputs provided by the rule evaluation step. The last step in the fuzzy logic process is referred to as "defuzzification." This step resolves competing results of the rule evaluation step into a single action. Defuzzification is the process of combining all of the fuzzy outputs into a composite result which may be applied to a standard data processing system. For more information about fuzzy logic, refer to an article entitled "Implementing Fuzzy Expert Rules in Hardware" by James M. Sibigtroth. The article was published in the April 1992 issue of AI EXPERT on pages 25 through 31.

In summary, rules are made up of a series of premises (antecedents) followed by one or more actions (consequences). Each antecedent corresponds to a fuzzy input and each action corresponds to a fuzzy output. Rule strengths may be multiplied by selected weights to emphasize selected rules.

In a hardware implementation of the rule evaluation step, dedicated connections and circuits are used to relate fuzzy inputs to fuzzy outputs. This approach often requires dedicated memory circuitry and is inflexible. In a software implementation of the rule evaluation step, a program of instructions is used to evaluate rules. The software approach is typically slower than the hardware approach and requires a significant amount of program memory. In an industry where data must be computed, moved, and manipulated as quickly as possible, fast execution times are essential. Therefore, software is not a viable solution for some applications.

Therefore, a need exists for a circuit or method for performing the rule evaluation step quickly, but without extensive hardware requirements. The speed typically associated with a hardware solution is needed without the dedicated circuit area usually associated with such a solution. This need is satisfied by the present invention, whose features and advantages will be more clearly understood from the following detailed description taken in conjunction with the accompanying drawings. It is important to note the drawings are not intended to represent the only form of the invention.

3

Figure 2:
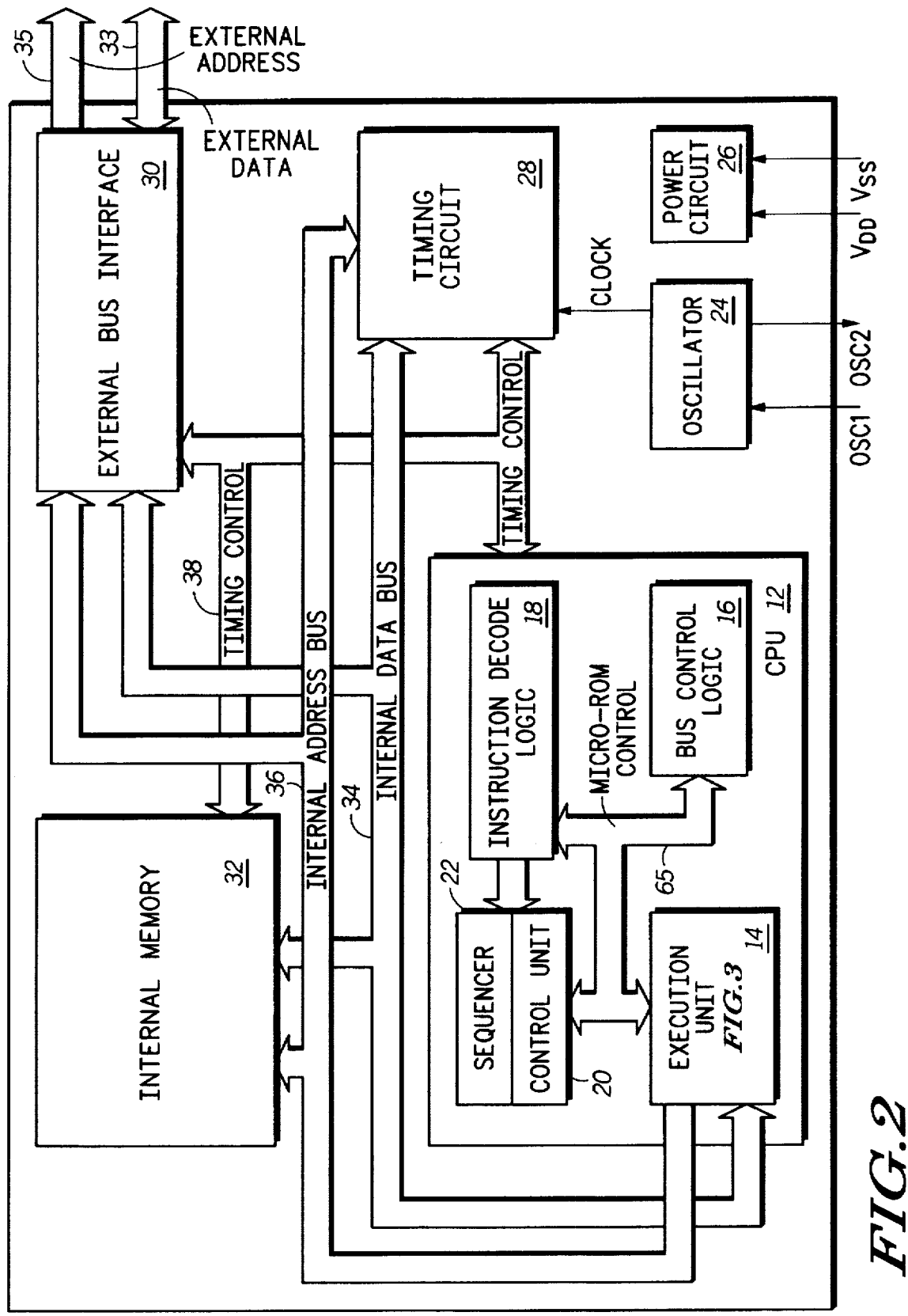
FIG. 2 illustrates in block diagram form a data processing system in accordance with the present invention.
Figure 5:
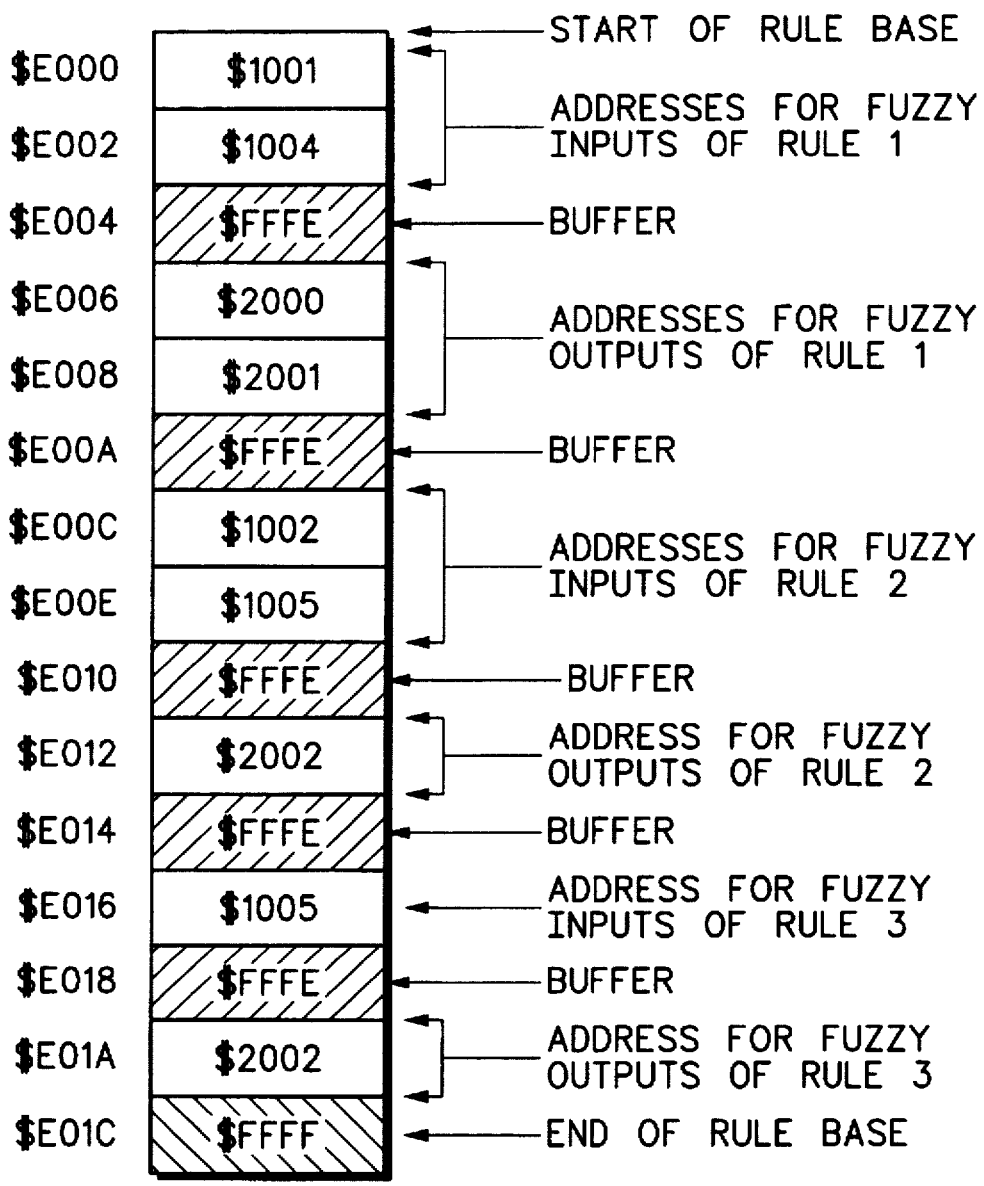
Figure 6:
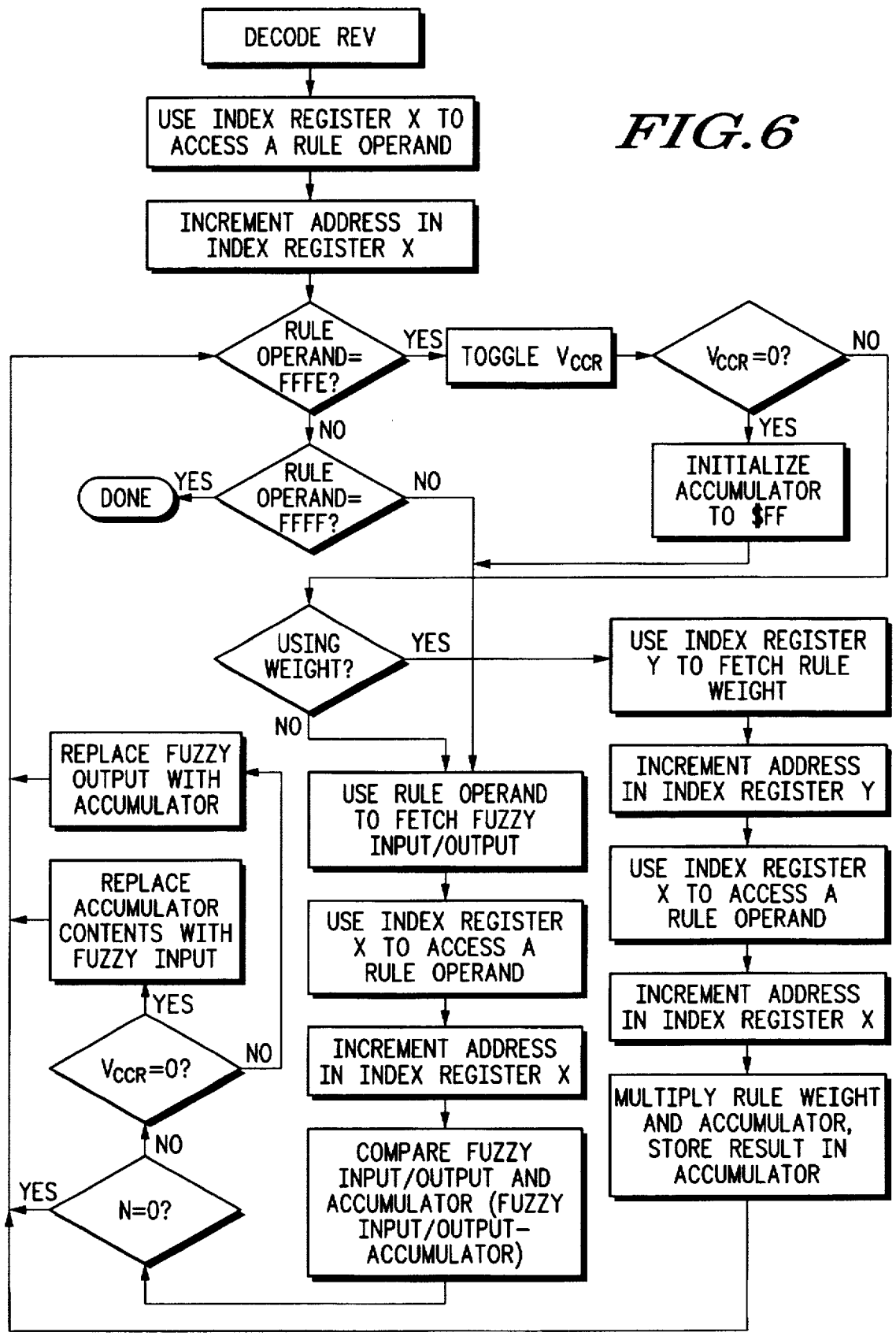

FIG. 5 illustrates in memory map form an array of rules to be evaluated in an internal memory of FIG. 2; and FIG. 6 illustrates in flow chart form a flow of functions performed during execution of the REVW instruction in accordance with the invention described herein.

DETAILED DESCRIPTION OF A PREFERRED EMBODIMENT

The present invention provides a data processing system and a method for performing a weighted rule evaluation operation in a data processing system quickly and with a minimum amount of circuitry. The weighted rule evaluation operation is encoded in a single instruction which is efficiently executed without an excessive amount of added circuitry in the data processing system. Therefore, the present invention provides an instruction which allows the user of the data processing system to perform the weighted rule evaluation step quickly without lengthy and time consuming software programs.

According to the present invention, a new instruction referred to with the mnemonic label "REVW" causes the data processing system to perform a series of steps involving the retrieval of operands from memory and the performance of arithmetic operations using those operands. If the membership function values for antecedents of the rule to be evaluated and the consequences of that rule have been appropriately stored in memory prior to execution of the REVW instruction, the execution of the REVW instruction results in proper evaluation and weighting of the rule. By assuming that the antecedents and consequences are stored in memory in a particular format, and by thoughtfully using existing hardware where possible in the execution of the instruction, a data processing system according to the present invention permits the efficient evaluation of fuzzy logic rules with very little additional hardware. For instance, the overflow, or V bit, of a condition code register used in the course of performing signed arithmetic in the data processor, is used in the present invention as a flag in connection with the processing of operands from memory. Also, the carry or C bit of the condition code register is used to indicate that a weighting operation is to be performed.

During a description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. Additionally, a hexadecimal value may be indicated by a "$" symbol preceding a value.

Figure 1:
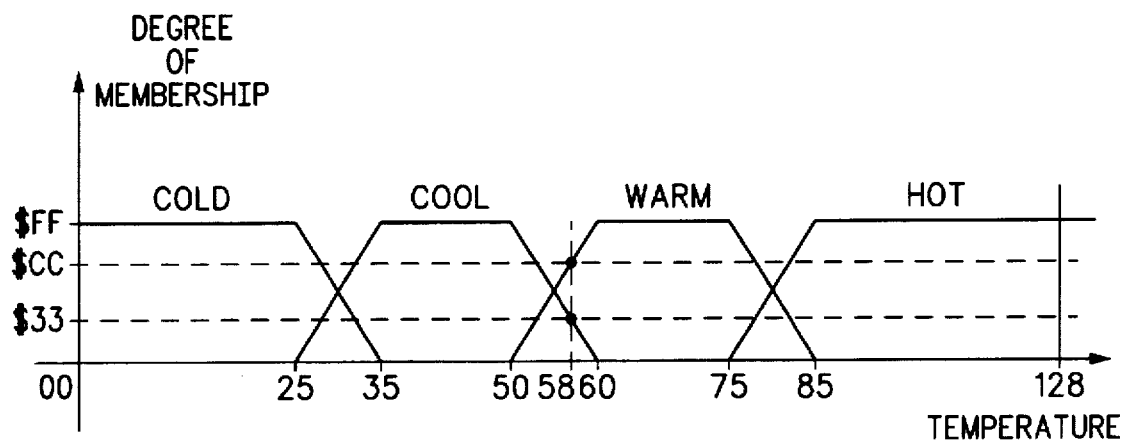
FIG. 1 illustrates in graph diagram form some general concepts and basic terminology used to describe fuzzy logic.

FIG. 1 provides a graph illustrating a few basic terms and concepts of fuzzy logic. In the fuzzy logic system described in FIG. 1, a "system input" is temperature in degrees Fahrenheit. Four "membership functions" are provided to give labels to a range of temperatures. For example, from 0 degrees to 35 degrees, a temperature is labeled "cold." Similarly, from 25 degrees to 60 degrees, the temperature is labeled "cool." Notice that the boundaries of each of the membership sets overlaps the boundaries of the adjacent sets. Therefore, a temperature may be in more than one membership set. For example, assume that the system input indicates a temperature of 58 degrees. Referring to FIG. 1, notice that 58 degrees is within the boundaries of both the cool and warm membership sets. However, a degree of membership in each of the membership sets may be

4 obtained. The system input has a degree of membership having a hexadecimal value of $33 for the cool membership set and a degree of membership having a hexadecimal value of $CC for the warm membership set. If the system input had indicated a temperature of 70 degrees, the temperature would have had a degree of membership with a hexadecimal value of $FF in the warm membership set. Likewise, the temperature of 70 degrees would have a degree of membership having a hexadecimal value of $00 in the hot membership set. In the fuzzy logic system described in FIG. 1, a degree of membership may range from a hexadecimal value of $00 to $FF, which corresponds to a fraction from 0.00 to 0.996. Those skilled in the art will recognize that a two place hexadecimal value may be represented by a single eight bit binary byte.

One implementation of the instruction and method of operation described above is implemented in a modified form of a MC68HC11 micro controller. The MC68HC11 is an eight bit micro controller which includes sixteen bit addresses and storage registers and is available from Motorola, Inc. of Austin, Tex. This implementation is illustrated in greater detail in FIG. 2.

FIG. 2 depicts a data processing system 10 in which the weighted rule evaluation instruction may be implemented. Data processing system 10 generally includes a central processing unit (CPU) 12, an oscillator 24, a power circuit 26, a timing circuit 28, an external bus interface 30, and an internal memory 32. CPU 12 generally has an execution unit 14, a bus control logic circuit 16, an instruction decode logic circuit 18, a control unit 20, and a sequencer 22.

During operation, an "Osc 1" signal is provided to oscillator 24 via an external source, such as a crystal. The crystal is connected between the Osc 1 and Osc 2 signals to enable the crystal to oscillate. The Osc 1 provides a "Clock" signal to a remaining portion of data processing system 10. Operation of a crystal oscillator is well known in the data processing art and should be apparent to one with ordinary skill in the art.

Power circuit 26 receives both a "Vdd" and a "Vss" signal from an external power source. The Vdd signal provides a positive 5 volts and the Vss signal provides a reference, or ground voltage. The Vdd and Vss signals are provided to each of the remaining components of data processing system 10. The routing of these signals is well known in data processing art and will be apparent to one with ordinary skill in the art.

Timing circuit 28 receives the Clock signal and subsequently provides appropriate timing signals to each of CPU 12, external bus interface 30, and internal memory 32 via a Timing Control bus 38.

A plurality of address values are provided from external bus interface 30 to an External Address bus 35. Similarly, a plurality of data values are communicated by external bus interface 30 via an External Data bus 33. External bus interface 30 controls receipt and transmission of address and data values between an external user and data processing system 10. External bus interface 30 communicates a plurality of address and data values to a remaining portion of data processing system 10 via an Internal Address bus 36 and an Internal Data bus 34, respectively.

Internal memory 32 functions to store information necessary for the proper operation of data processing system 10. Additionally, other data values may be stored therein if specified in a user program provided via Internal Address bus 36 and Internal Data bus 34.

CPU 12 executes each of the instructions required during operation of data processing system 10. Internal Address bus 36 and Internal Data bus 34 communicate information between execution unit 14 and a remaining portion of data processing system 10. Bus control logic circuit 16 fetches instructions and operands. Each of the instructions is then decoded by instruction decode logic circuit 18 and provided to control unit 20 and sequencer 22. Control unit 20 and sequencer 22 maintain a sequence of execution of each of the instructions to most efficiently utilize the computing capabilities of data processing system 10. Additionally, control unit 20 includes a Micro-ROM memory (not shown) which provides a plurality of control information to each of execution unit 14, bus control logic 16, and instruction decode logic 18 via a Micro-ROM Control Bus 65. The plurality of control information is necessary for proper execution of the REVW instruction.

Figure 3:
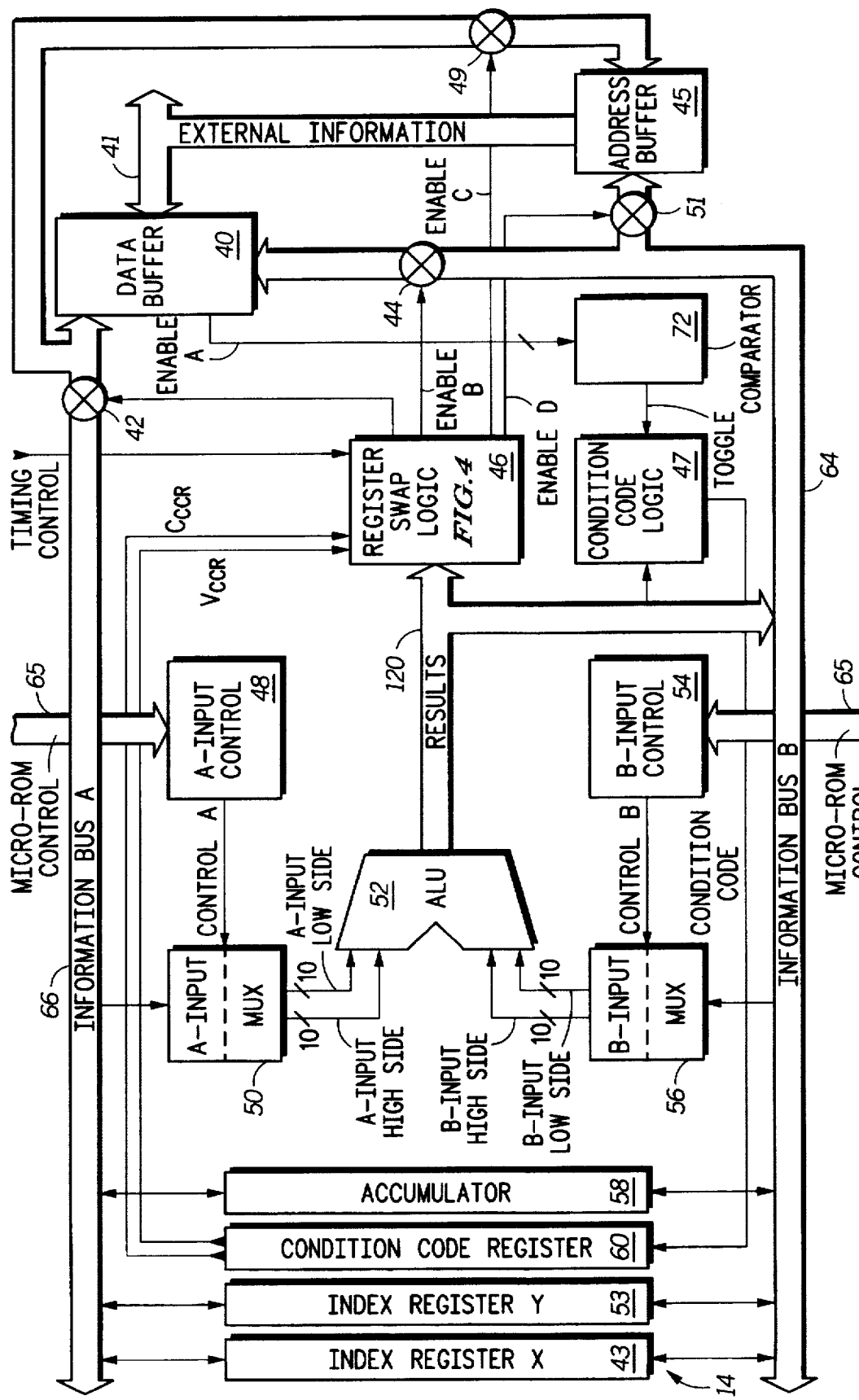
FIG. 3 illustrates in block diagram form an execution unit of FIG. 2.

Execution unit 14 is illustrated in greater detail in FIG. 3. Execution unit 14 generally includes a data buffer 40, a first selector 42, an index register 43, a second selector 44, a register swap logic circuit 46, a condition code logic circuit 47, an A-input control circuit 48, a third selector 49, an A-input multiplexor 50, a fourth selector 51, an arithmetic logic unit (ALU) 52, a B-input control circuit 54, a B-input multiplexor 56, an accumulator 58, a condition code register 60, a comparator 72, and an address buffer 45. In addition to accumulator 58 and condition code register 60, other storage registers may be implemented in execution unit 14 such as Index Register X 43 and Index Register Y 53, and a second accumulator may also be included.

An External Information bus 41 provides address and data information to data buffer 40. External Information bus 41 receives the address and data information from Internal Address bus 36 and Internal Data bus 34, respectively (see FIG. 2). Data buffer 40 provides the values transferred via External Information bus 41 to remaining portions of execution unit 14 via an Information Bus A 66 and an Information Bus B 64 when selectors 42 and 44 are respectively enabled to allow information to be transferred. Although not shown in detail here, both Information Bus A 66 and Information Bus B 64 are sixteen bits wide and are divided into a high side (bit 15 through bit 8) and a low side (bit 7 through bit 0). Additionally, data buffer 40 provides address information to comparator 72. Address buffer 45 receives addresses of weights to be applied from Index Register Y 53, or addresses of fuzzy inputs or outputs supplied from data buffer 40.

A first and a second input of accumulator 58 are bidirectionally coupled to Information Bus A 66 and Information Bus B 64, respectively. Additional Index Register X 43 and Index Register Y 53 are similarly coupled to Information Bus A 66 and Information Bus B 64.

A plurality of control signals are provided to both A-input control logic 48 and B-input control logic 54 via the Micro-ROM Control bus 65. Micro-ROM Control bus 65 provides the plurality of control signals in response to information provided by a Micro-ROM memory (not shown) in control unit 20.

A-input control 48 provides a "Control A" signal to a control input of A-input multiplexor 50. Information Bus A 66 is connected to a data input of A-input multiplexor 50. A-input multiplexor 50 provides both a first ten bit output labeled "A-Input Low Side" to a first input of ALU 52 and a second ten bit output labeled "A-Input High Side" to a second input of ALU 52. B-Input control 54 provides a "Control B" signal to a control input of B-input multiplexor 56. Information Bus B 64 is connected to a data input of B-input multiplexor 56. B-input multiplexor 56 provides both a first ten bit output labeled "B-Input Low Side" to a third input of ALU 52 and a second ten bit output labeled "B-Input High Side" to a fourth input of ALU 52.

ALU 52 processes each of the inputs to provide a plurality of results which are transferred via a Results bus 120. Results bus 120 provides the results provided by ALU 52 to register swap logic 46 and condition code logic 47. Additionally, Results bus 120 provides the plurality of results to Information Bus B 64.

Condition code logic 47 is also coupled to comparator 72 to receive a Toggle signal. Condition code logic 47 is coupled to condition code register 60 to provide a "Condition Code" signal.

Condition code register 60 provides a $V_{CCR}$ signal to a second control input of register swap logic 46 and a $C_{CCR}$ signal to a third control input of swap logic 46. Additionally, a Timing Control signal is provided to a first control input of register swap logic 46. The Timing Control signal is provided via Timing Control Bus 38. Register swap logic 46 provides a first and a second output, respectively labeled "Enable A" and "Enable B" and a third and fourth output labeled respectively "Enable C" and "Enable D." The Enable A signal is provided to a first control input of selector 42. Information Bus A 66 is bidirectionally coupled to selector 42. An output of selector 42 is coupled to data buffer 40 to communicate a plurality of selected signals. Similarly, the Enable B signal is provided to a first input of selector 44. Information Bus B 64 is bidirectionally coupled to selector 44. An output of selector 44 is coupled to data buffer 40 to communicate a second plurality of selected signals. The Enable C signal is provided to a first control input of selector 49. Information Bus A 66 is bidirectionally coupled to selector 49 and to Address Buffer 45 to communicate addresses of selected weights. Similarly, the Enable C signal is provided to a first control input of selector 51. Information Bus B 64 is bidirectionally coupled to selector 51 to communicate addresses of selected weights.

Figure 4:
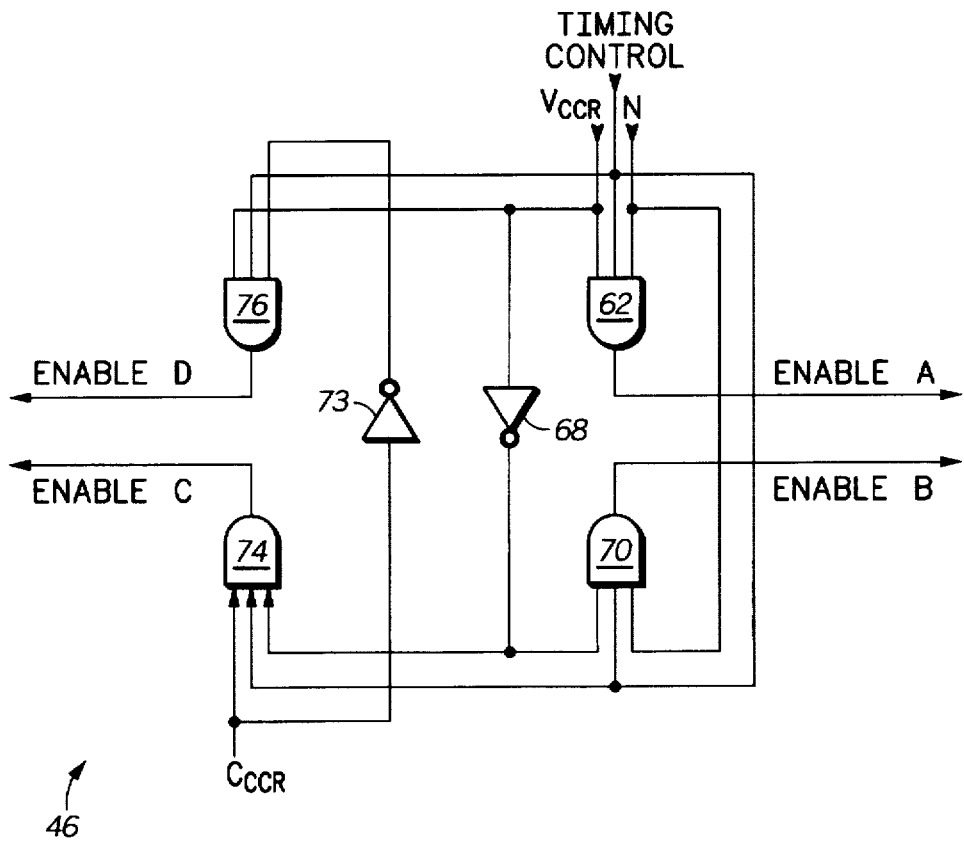
FIG. 4 illustrates in logic circuit form a register swap logic circuit of FIG. 3.

Register swap logic 46 is illustrated in greater detail in FIG. 4. Generally, register swap logic 46 includes AND gates 62, 70, 74 and 76, and inverters 68 and 73. AND gate 62 has a first input terminal for receiving signal $V_{CCR}$, a second input terminal for receiving the Timing Control signal, a third input for receiving a signal labelled "N" from ALU 52 via Results bus 120, and an output terminal for providing signal ENABLE A. Inverter 68 has an input terminal for receiving signal $V_{CCR}$ and an output terminal. AND gate 70 has a first input terminal connected to the output terminal of inverter 68, a second input terminal for receiving the Timing Control signal, a third input for receiving a signal labelled "N" from ALU 52 via Results bus 120, and an output terminal for providing signal ENABLE B. Inverter 73 has an input terminal for receiving signal $C_{CCR}$, and an output terminal. AND gate 74 has a first input terminal for receiving signal $C_{CCR}$, a second input terminal for receiving the Timing Control signal, a third input connected to the output terminal of inverter 68, and an output terminal for providing signal ENABLE C. AND gate 76 has a first input terminal for receiving signal $V_{CCR}$, a second input terminal for receiving the Timing Control signal, a third input connected to the output terminal of inverter 73, and an output terminal for providing signal ENABLE D.

During execution of a fuzzy logic operation, a user of data processing system 10 may use the instruction REVW (Rule EValuation Weighted) to perform the rule evaluation step on fuzzy inputs. As was previously stated, fuzzy inputs are provided as a result of a fuzzification step in which a system input signal is assigned a degree of membership to each of a plurality of defined membership sets. In the implementation of the invention described herein, each of the degrees of membership assigned to a fuzzy input is stored in a predetermined memory location in internal memory 32 of data processing system 10 prior to execution of the REVW instruction. Assignation of each of the degrees of membership to a plurality of fuzzy inputs is disclosed in more detail in U.S. Pat. No. 5,295,229, entitled "Circuit and Method for Determining Membership in a Set During a Fuzzy Logic Operation" as well as in the cross-referenced co-pending patent application Ser. No. 08/363,196, now U.S. Pat. No. 5,671,332, issued Sep. 23, 1997, entitled "Data Processing System for Performing Efficient Fuzzy Logic Operations and Method Therefor," by J. Greg Viot.

Assume, in the example described herein, that two groups of membership sets are used during fuzzification of a first and a second system input. A first one of the two groups provides temperature measurements which are separated into membership sets of cold, cool, warm, and hot. When fuzzified, a degree of membership of the first system input in the cool membership set is referred to using a variable labeled $T_{cool}$. Similarly, a degree of membership of the first system input in each of the cold, warm, and hot membership sets is referred to a respective one of the linguistic variables $T_{cold}$, $T_{warm}$, and $T_{hot}$.

A second one of the two groups provides pressure measurements which are separated into membership sets of light, medium, and heavy. When fuzzified, a degree of membership of the second system input in the light, medium, and heavy membership sets is referred to using one of the linguistic variables respectively labeled $P_{light}$, $P_{medium}$, and $P_{heavy}$. After the system inputs have been fuzzified, the degree of membership of the first and second system inputs in each of the respective membership sets is stored in a predetermined location in memory. Additionally, rules must be evaluated to provide appropriate actions. Assume in this example that three rules which are to be evaluated have the following forms:

(1) Rule 1: If temperature is cool ($T_{cool}$) and pressure is light ($P_{light}$), then (Action 1) and (Action 2);

(2) Rule 2: If temperature is warm ($T_{warm}$) and pressure is medium ($P_{medium}$), then (Action 3); and (3) Rule 3: If pressure is medium ($P_{medium}$), then (Action 3).

Note that each of the rules has a form which typically has the form:

(4) If (Fuzzy Input 1) and (Fuzzy Input 2), then (Action X) and (Action Y).

During rule evaluation, the "if" portion of the rule is evaluated first to determine a minimum degree of membership value. The "if" portion of the rule includes both the Fuzzy Input 1 value and the Fuzzy Input 2 value. A common method to determine rule strength is to determine a minimum degree of membership of the fuzzy inputs being evaluated. Other implementations do exist, however. For example, a strength of a rule may be calculated as the sum of the degrees of membership of each of its antecedents. Similarly, the degrees of membership may be multiplied or manipulated in any type of calculation to determine a rule strength.

In this implementation, the strength of the rule is only as strong as the weakest component. The weakest degree of membership value is used to determine a rule strength value of each of the actions specified in the "then" portion of the rule. In the rule shown in form (4), a rule strength corresponding to a minimum of the Fuzzy Input 1 and Fuzzy Input 2 values is stored in a first and a second address location in internal memory 32 pointed to by the addresses of the Action X and Action Y values, respectively. Each of the rule strengths corresponding to a predetermined one of the plurality of action values is used to provide a fuzzy output value which corresponds to a respective action. The fuzzy output value may then be defuzzified to perform an operation specified by the user. Although only two fuzzy input values and two action values are provided in form (4), either more or less values may be provided. The user of data processing system 10 determines the form of the rules and may provide any number of fuzzy inputs or actions to be performed.

Additionally, when more than one rule is to be evaluated, a possibility exists for an action to be assigned more than one rule strength. In such a situation, the rule strength with a greater value should be assigned to the action. Therefore, the action is assigned a rule strength of greatest value.

In accordance with the present invention, data processing system 10 also weights the rule strength in response to the REVW instruction. Data processing system 10 weights the rule strength by multiplying the rule strength, obtained as the minimum of the fuzzy inputs, by multiplying this minimum value by a weight. Equations 5 and 6 describe, mathematically, the weighted rule evaluation operation, where "W1" and "W2" denote the weight to be used to evaluate the fuzzy outputs for Action X and Action Y, respectively.

MAX([MIN(Fuzzy Input 1, Fuzzy Input 2)]·W1, Action X)  (5)

(6) MAX([MIN(Fuzzy Input 1, Fuzzy Input 2)]·W2, Action Y) (6)

Data processing system 10 then stores these maximum values as the consequence values for Actions X and Y.

In the implementation of the invention described herein, internal memory 32 is generally used for memory storage. However, other memory circuits (not shown) external to data processing system 10 may also be used. Implementation and use of such external memory circuits is well known in the data processing art and should be apparent to one of ordinary skill. In this implementation, each of the fuzzy inputs is stored in internal memory 32 in the form:

| Array 1 | | |
|---|---|---|
| Memory Address | Fuzzy Inputs | Comment |
| $1000 | $00 | $T_{cold}$ |
| $1001 | $33 | $T_{cool}$ |
| $1002 | $CC | $T_{warm}$ |
| $1003 | $00 | $T_{hot}$ |
| $1004 | $00 | $P_{light}$ |
| $1005 | $FF | $P_{medium}$ |
| $1006 | $00 | $P_{heavy}$ |

As illustrated in Array 1, for the two system inputs, temperature and pressure, a degree of membership denoted as a "Fuzzy Input" is provided for each membership set for each system input. As was previously described with reference to FIG. 1, a first system input is a temperature of 58 degrees Fahrenheit. The temperature of 58 degrees Fahrenheit was fuzzified to have a degree of membership of $00 in the cold and hot membership sets, a degree of membership of $33 in the cool membership set, and a degree of membership of $CC in the warm membership set. As shown in Array 1, the values of both the Tcold and Thot variables are $00, which indicates that the first system input is not in either of those two membership sets. However, the first system input has a Tcool with a value of $33 and a Twarm with a value of $CC. Therefore, the first input does have a degree of membership of $33 in the cool membership set and a degree of membership of $CC in the warm membership set.

Similarly, a second input is fuzzified to indicate a degree of membership of $00 in both the light and heavy pressure membership sets. Therefore, the values of both the Plight and Pheavy variables are $00, which indicates that the second input is not included in either of those two membership sets. However, the second input does have a degree of membership of $FF in the moderate membership set. Therefore, the Pmedium variable has a value of $FF.

Like the fuzzy inputs, each of the rules to be evaluated (Rule 1 through Rule 3) is also stored in a rule array in internal memory 32. The rule array is illustrated in FIG. 5. For each rule, address locations for both the fuzzy inputs and the fuzzy outputs are provided. The addresses of the fuzzy inputs and fuzzy outputs are stored in the form of FIG. 5 and reference a table of data values such as that previously shown in Array 1. Like the fuzzy inputs, the table of data values corresponding to the fuzzy outputs is also provided in an array which is not shown in detail herein.

A start of the rule array is located at a predetermined address specified by a user of data processing system 10. In the example described herein and illustrated in FIG. 5, the predetermined address is equal to $E000 and is stored in the index register prior to execution of the REVW instruction. An address of a first one of the fuzzy inputs for a Rule 1 is located at hexadecimal address $E000, the start of the rule base. In this example, Tcool is the first fuzzy input for Rule 1 and an address of $1001 is stored at address $E000 of the rule array. Because the Plight value is the second fuzzy input of Rule 1, an address of $1004 is stored in the rule array at address $E002.

To separate the fuzzy inputs from the fuzzy outputs, a buffer with a value of $FFFE is stored in the rule array at address $E004. Subsequently, the fuzzy outputs of Rule 1 are separated from the fuzzy inputs of Rule 2 by a buffer with a value of $FFFE. This format, in which any number of fuzzy inputs is separated from any number of fuzzy outputs, by a buffer with a value of $FFFE is repeated until each of the fuzzy inputs and outputs of the plurality of rules is stored in memory. Each buffer value of $FFFE that separates the fuzzy inputs from the fuzzy outputs, within the same rule, triggers the weighting process for that rule. At that point, a special buffer value indicates the end of the rule base. In the example described herein, the end of the rule base is denoted by a value of $FFFF. Although the same buffer value is used to separate the fuzzy inputs from the fuzzy outputs of each rule, any number of buffers may be used by the designer of data processing system 10.

By placing each of the fuzzy inputs and outputs for each of the rules in such an order, each of the rules may be evaluated sequentially by using the buffer addresses as an indicator of a division between each of the fuzzy input and output sections. Therefore, the rules don't have to follow a fixed format with a specific number of fuzzy inputs and fuzzy outputs (actions). This allows for greater flexibility in providing rules for the fuzzy system. As may be seen in Rule 1, Rule 2, and Rule 3[(1), (2), and (3)], the number of fuzzy inputs and corresponding actions may vary from rule to rule in the present implementation of the invention.

To begin execution of the REVW instruction, each of the fuzzy input and outputs of the rules must be stored in memory in the rule array having the predetermined format illustrated in FIG. 5. And, if rules are weighted, then a weight value for each rule must be stored in memory in the weight array. Additionally, the starting address of the rule array must be stored in Index Register X 43, accumulator 58 must be initialized with a hexadecimal value of $FF, and Index Register Y 53 must be initialized with the starting address of the weight array if rule weighting is employed, prior to execution of the REVW instruction. Additionally, each of the fuzzy outputs must be assigned a hexadecimal value of $00 prior to execution of the REVW instruction. Execution of the REVW instruction may then be performed in accordance with the flow chart illustrated in FIG. 6. The flow chart will provide a brief overview of each of the functions performed during execution of the REVW instruction. A more detailed explanation of each of the functions will follow during a course of an example of execution of the REVW instruction.

As illustrated in FIG. 6, a first step in the execution of the REVW instruction is performed when the REVW instruction is decoded. The address stored in the index register, herein referred to as "X", is then used to fetch a first rule operand. Address X is then incremented to point at a next address location (X+2).

The value of the first rule operand is then tested to determine whether or not the value equals hexadecimal $FFFE. If the value equals hexadecimal $FFFE, the $V_{CCR}$ signal is toggled to indicate that a buffer value was retrieved. If the $V_{CCR}$ signal is equal to zero after being toggled, a first fuzzy input of a rule is to be evaluated and accumulator 58 should be initialized to a hexadecimal value of $FF. Otherwise, the value of accumulator 58 is not modified.

If the value of the first rule operand is not equal to $FFFE, the value is tested to determine whether or not it equals hexadecimal $FFFF. If the value equals hexadecimal $FFFF, an end of the rule array has been accessed and the REVW instruction is terminated.

If the value of the first rule operand is not equal to $FFFF, however, the value of the first rule operand is used to access a fuzzy input or output value from internal memory 32. The contents of accumulator 58 are then subtracted from the fuzzy input or output value to provide a signed result. The sign of the result is indicated by a value of the N signal.

If the N signal is equal to zero, then the contents of both accumulator 58 and data buffer 40 should not be swapped and the address stored in the index register accesses a next rule operand. However, if the N signal is equal to one, the $V_{CCR}$ signal is tested.

If the $V_{CCR}$ signal is equal to zero, the contents of accumulator 58 should be replaced with the value of the fuzzy input value accessed by the first rule operand. Therefore, a minimum function is used to determine a rule strength which will be assigned to the fuzzy outputs of the rule currently being evaluated. Next, the address stored in the index register is used to access a next rule operand.

If the $V_{CCR}$ signal is equal to one, the contents of data buffer 40 should be replaced with the stronger rule strength in accumulator 58. Therefore, a maximum rule strength is assigned to the fuzzy output currently being evaluated. Next, the address stored in the index register is used to access a next rule operand.

The flow chart illustrated in FIG. 6 provides an overview of execution of the REVW instruction in data processing system 10. A more detailed example will now be given.

The fundamental operation of the REVW instruction is as follows: each of the antecedent values is retrieved from memory and a minimum antecedent value is determined, influenced by a weighting value; then each of the consequence values is retrieved, compared to the rule strength value and replaced in memory with that rule strength value if and only if the pre-existing consequence value is less than the rule strength value.

As was previously described, the plurality of fuzzy inputs is stored in a first predetermined memory location in internal memory 32 by the user of data processing system 10 prior to execution of the REVW instruction. The plurality of fuzzy inputs is stored in accordance with Array 1. Additionally, each of the rules for evaluating the plurality of fuzzy inputs is also stored in a second predetermined memory location in internal memory 32 in the form illustrated in FIG. 5. Weight values are also stored, in a sequential fashion in memory, addressable by addresses from Index Register Y 53. Although not shown in detail herein, each of the rule strength values corresponding to the fuzzy outputs is also stored in internal memory 32 at a starting address of $2000 in an array similar to Array 1. The user of data processing system 10 must also assign all of the values of the fuzzy outputs a hexadecimal value of $00 prior to execution of the REVW instruction. Additionally, the user of data processing system 10 must initialize accumulator 58 to a hexadecimal value of $FF prior to execution of the REVW instruction. As was previously stated, when accumulator 58 is initialized to $FF, the $V_{CCR}$ signal is negated.

During operation, a user may provide the REVW instruction to data processing system 10 through a software program stored either externally or in internal memory 32. Should the REVW instruction be provided by a source external to data processing system 10, the REVW instruction would be input via external data bus 33 to external bus interface 30. External bus interface 30 would subsequently provide the REVW instruction to CPU 12 via internal data bus 34. If the REVW instruction was provided by a software program in internal memory 32, the REVW instruction would be provided to CPU 12 via internal data bus 34. In CPU 12, execution unit 14 would provide the REVW instruction to instruction decode logic circuit 18 in response to control signals received from each of bus control logic circuit 16, control unit 20, and sequencer 22. Additionally, each of the components of CPU 12 receive timing control signals via Timing Control bus 38. Routing and use of such timing control signals are well known in the data processing art and, as such, will not be discussed in detail herein.

Instruction decode logic circuit 18 decodes the REVW instruction to provide a plurality of control and information signals necessary for the proper execution of the REVW instruction. Upon receipt and decoding of the REVW instruction, execution unit 14 begins the steps necessary to evaluate a plurality of fuzzy inputs stored in internal memory 32. Control unit 20 and sequencer 22 of CPU 12 in FIG. 2 collectively provide a series of sequencing control signals necessary to transfer pointers to the addresses of both the fuzzy inputs and the fuzzy outputs from internal memory 32 to execution unit 14.

To begin execution of the REVW instruction, Index Register X 43 in execution unit 14 provides a pointer to the start of the rule base. Index registers and their use in data processing systems are commonly known in the data processing art and, therefore, are not explained in detail herein. The pointer points to a starting address of the rule base in internal memory 32 where a degree of membership of the first input in the cool temperature membership set is stored. The address indicates an address where the first fuzzy input value of Rule 1 is stored. In the example described herein, hexadecimal address $1001 is stored at address $E000 in internal memory 32.

When the address of the first fuzzy input value of Rule 1 is accessed from the rule array, the address is provided to data buffer 40 via External Information bus 41. Data buffer 40 subsequently provides the address value to comparator 72 where the address value is compared to a hexadecimal value of $FFFE. If the address value is equal to $FFFE, a buffer address is pointed to and the $V_{CCR}$ bit should be toggled. Traditionally, the $V_{CCR}$ bit is used to indicate an overflow error in a signed arithmetic calculation. However, in this implementation of the invention, the overflow bit ($V_{CCR}$) in a condition code register is set to indicate whether the accessed address corresponds to either a fuzzy input address, a buffer address, or a fuzzy output address. When an address corresponding to the fuzzy inputs of a first rule is accessed, the $V_{CCR}$ bit remains negated. If the accessed address accessed is a buffer value, the $V_{CCR}$ bit is toggled. In the example described herein, the buffer value is equal to a hexadecimal value of $FFFE. Additionally, when the addresses of the fuzzy outputs are accessed, the $V_{CCR}$ bit remains asserted.

When the address value equals $FFFE, comparator 72 asserts the Toggle signal. Condition code logic circuit 47 receives the Toggle signal and subsequently provides an asserted Condition Code signal to condition code register 60. In turn, condition code register 60 either asserts or negates the $V_{CCR}$ signal accordingly. If both signals $V_{CCR}$ and $C_{CCR}$ are asserted, then Index Register Y 53 provides an address in memory of a weight value which is fetched. The weight value multiplies the minimum fuzzy logic inputs to influence the fuzzy logic outputs.

In the example described herein, an address value of $1001 is accessed from address $E000, the address of the first fuzzy input value of Rule 1 in the rule array. Because $1001 does not equal $FFFE, comparator 72 does not assert the Toggle signal. Therefore, the Condition Code signal provided by condition code logic circuit 47 does not enable condition code register 60 to toggle the $V_{CCR}$ signal.

Comparator 72 also compares the address value of the first fuzzy input of Rule 1 with a hexadecimal value of $FFFF. If the address value is equal to $FFFF, an end of rule array address is pointed to and execution of the REVW instruction is terminated.

Additionally, when address $1001 is accessed from internal memory 32, a degree of membership of the first system input in the cool temperature membership set is provided. As shown in Array 1, the degree of membership is equal to a hexadecimal value of $33. Internal memory 32 provides the information to data buffer 40 of execution unit 14 via Internal Data bus 34. External Information bus 41 provides information transferred via both Internal Address bus 36 and Internal Data bus 34.

The first fuzzy input ($33) is stored in data buffer 40 for subsequent processing. To determine a minimum degree of membership of the antecedents of Rule 1, the current contents of accumulator 58 ($FF) are subtracted from the first fuzzy input ($33). To perform this function, the contents of accumulator 58 are provided to Information Bus A 66 and the contents of data buffer 40 are provided to Information Bus B 64. Additionally, a plurality of control and timing signals are provided to execution unit 14 via Micro-ROM control bus 65. The plurality of control and timing signals is provided as a result of decoding the REVW instruction by instruction decode logic 18 of FIG. 2.

In execution unit 14, the first fuzzy input is provided to A-input multiplexor 50 and the contents of accumulator 58 are provided to B-input multiplexor 56 at a point in time determined in accordance with the timing signals transferred via Micro-ROM Control bus 65. B-input control circuit 54 provides a "Control B" signal to control operation of B-input multiplexor 56. In this example, the Control B signal allows B-input multiplexor 56 to pass an unmodified first fuzzy input value to ALU 52. Similarly, A-input control circuit 54 provides a "Control A" signal to A-input multiplexor 50. The Control A signal allows A-input multiplexor 50 to negate the contents of accumulator 58 such that the contents may be subtracted from the first fuzzy input in ALU 52.

Upon receipt of the first fuzzy input value and a negated accumulator content value, ALU 52 subtracts the contents of accumulator 58 ($FF) from the first fuzzy input ($33) to provide a result. The result is a negative number ($33–$FF= –$CC) and the N signal is asserted. The asserted N signal is transferred via Results bus 120. If the result had been positive, the N flag would not have been set and a negated N signal would have been provided via Results bus 120. The numerical result of the subtraction operation is not required and is, therefore, written over during subsequent arithmetic operations.

Register swap logic 46 allows the user to determine a minimum degree of membership in each of the fuzzy inputs of a rule. At this point, the contents of accumulator 58 are multiplied by a selected weight value. Then the weighted result is used as a rule strength for each of the actions specified by the rule. During operation, register swap logic 46 may or may not switch the contents of accumulator 58 and data buffer 40 depending on values of the $V_{CCR}$ and N signals.

Register swap logic 46 receives the $V_{CCR}$ signal, N signal, and a Timing Control signal to control switching of the contents of accumulator 58 and data buffer 40. As was previously mentioned, when a fuzzy input value is provided to execution unit 14 from internal memory 32, the $V_{CCR}$ signal remains negated. Additionally, ALU 52 provides the N signal to indicate whether a result of a subtraction of the contents of accumulator 58 from the contents of data buffer 40 is positive or negative. If the contents of accumulator 58 are greater than the first fuzzy input which is stored in data buffer 40, the N signal is asserted to indicate a negative result. Conversely, if the first fuzzy input is less than the contents of accumulator 58, the N signal remains negated to indicate a positive result. At an appropriate time determined by timing circuit 28, the Timing Control signal is asserted to enable register swap logic circuit 46 to either transfer the contents of accumulator 58 to data buffer 40, to transfer the contents of data buffer 40 to accumulator 58, or to let the contents of both accumulator 58 and data buffer 40 remain the same.

Register swap logic 46 (FIG. 4) also receives signals $C_{CCR}$, applied to AND Gate 74. The negation signal $C_{CCR}$ is applied to gate AND gate 76. Signal ENABLE C, the output of AND gate 74, is asserted when the weighting operation is to be done. Signal ENABLE D is asserted from the output of AND gate 76 when weighting is not to be done.

Referring now to FIG. 3, it can be seen that the ENABLE C signal activates selector 49 enabling an address from Index Register Y 53 to be inserted into address buffer 45. Address buffer 45, at the appropriate time as determined by a timing control signal as described above, fetches a weight value from memory at the address from Index Register Y 53. The weight value fetched is then used to multiply the contents of accumulator 58. If the D signal is enabled, address buffer 45 cannot be entered and therefore there is no retrieval of any weight value from memory.

During evaluation of the "if" portion of Rule 1, when the contents of accumulator 58 are subtracted from the first fuzzy input, a negative result is generated ($33–$FF=– $CC). Therefore, the N signal remains asserted.

Additionally, the $V_{CCR}$ signal is negated to indicate that a fuzzy input is being retrieved from internal memory 32. When the Timing Control signal is asserted, an output of AND gate 62 is equal to zero and the Enable A signal is not asserted. However, the output of inverter 68 is asserted and AND gate 70 is enabled to assert the Enable B signal. When the Enable B signal is asserted, selector 44 is enabled to transfer data from data buffer 40 to accumulator 58. The minimum degree of membership is, at this point, $33, and is stored in accumulator 58.

Similarly, the second fuzzy input of Rule 1 is provided to data buffer 40. The second fuzzy input is the degree of membership the second system input has in the light pressure (Plight) membership set. In this example, the degree of membership has a hexadecimal value of $00. Again, internal memory 32 provides the degree of membership of the second fuzzy input to data buffer 40 of execution unit 14 via External Information bus 41.

To determine a minimum degree of membership, the first fuzzy input is subtracted from the second fuzzy input. In execution unit 14, the first fuzzy input is provided to A-input multiplexor 50 and the second fuzzy input is provided to B-input multiplexor 56 at a point in time determined in accordance with the timing signals transferred via Micro-ROM Control bus 65. B-input control circuit 54 provides a "Control B" signal to control operation of B-input multiplexor 56. In this example, the Control B signal allows B-input multiplexor 56 to pass an unmodified second fuzzy value to ALU 52. Similarly, A-input control circuit 54 provides a "Control A" signal to A-input multiplexor 50. The Control A signal allows A-input multiplexor 50 to negate the first fuzzy input such that it may be subtracted from the second fuzzy input in ALU 52.

Upon receipt of the second fuzzy input value and a negated first fuzzy input value, ALU 52 subtracts the first fuzzy input value from the second to again provide a negative result. Therefore, the N signal is asserted. Additionally, the $V_{CCR}$ signal is negated to indicate that a fuzzy input is being retrieved from internal memory 32.

When the Timing Control signal is asserted, an output of AND gate 62 is equal to zero and the Enable A signal is not asserted. In this first example, AND gate 70 does assert the Enable B signal. When the Enable B signal is asserted, selector 44 is enabled to transfer data from data buffer 40 to accumulator 58. Therefore, the minimum degree of membership is, at this point, $00, and is stored in accumulator 58.

At the end of the memory locations of the fuzzy inputs for Rule 1, a buffer address is recognized by comparator 72. Comparator 72 provides an asserted Toggle signal to condition code logic circuit 47. Condition code logic circuit 47 then provides the Condition Code signal to condition code register such that the V bit in condition code register 60 is toggled to provide an asserted $V_{CCR}$ signal. As was previously explained, the $V_{CCR}$ signal is asserted to indicate that an address of a fuzzy output of Rule 1 is the next address to be retrieved from internal memory 32. In the example described herein, the $V_{CCR}$ signal is asserted during execution of the "then" portion of the REVW instruction when the addresses of the fuzzy outputs for Rule 1 are retrieved from internal memory 32.

When one of a plurality of fuzzy outputs is chosen, a maximum operation is performed. Therefore, for the "then" portion of the REVW instruction, a maximum rule strength is assigned to each fuzzy output. As was previously explained, a maximum rule strength should be assigned for each fuzzy output. Therefore, the minimum degree of membership value stored in accumulator 58 as a result of execution of the "if" portion of the REVW instruction is compared to a rule strength value currently stored at the fuzzy output address in internal memory 32. The current rule strength value resides stored in accumulator 58 during execution of the "then" part of the REVW instruction. The maximum rule strength value is always stored in internal memory 32. As was previously discussed, the minimum degree of membership value was calculated in a first part of the REVW instruction where degrees of membership of each of the fuzzy inputs are compared to determine a minimum value, modified by a weight value, if desired. If this weight is 0, the product in accumulator 58 is 0, which has no effect on its fuzzy outputs. Essentially, a rule with a weight of 0 is "turned off".

The minimum value of the fuzzy inputs remains in accumulator 58. The address pointers to fuzzy outputs of the rule currently being evaluated are then provided from the rule array. The index register (not shown) in execution unit 14 increments the pointer to point to an address of the first fuzzy output. In this example, the pointer is incremented to address $E006. At address $E006, an address of the first fuzzy output, hexadecimal address $2000, is provided. Because the user of data processing system 10 assigns all data values stored in the fuzzy output array a hexadecimal value of $00 prior to execution of the REVW instruction, internal memory 32 provides a hexadecimal value of $00 when address $2000 is accessed. The value of the fuzzy output ($00) is then provided to data buffer 40 via External Information bus 41 where the fuzzy output value is stored for subsequent operations.

To determine a maximum rule strength value, the contents of accumulator 58 are subtracted from data buffer 40 to determine which has a greater value. In other words, the minimum degree of membership value calculated during the "if" portion of the rule evaluation step is multiplied by a rule weight (if weights are being used), and then subtracted from the rule strength value currently stored in the address location of the first fuzzy output of Rule 1. To perform this function, the contents of accumulator 58 are provided to Information Bus A 66 and the contents of data buffer 40 are provided to Information Bus B 64. Additionally, a plurality of control and timing signals are provided to execution unit 14 via Micro-ROM control bus 65. The plurality of control and timing signals is provided as a result of decoding the REVW instruction by instruction decode logic 18 of FIG. 2.

In execution unit 14, the resulting rule strength value stored in accumulator 58 is provided to A-Input multiplexor 50 and the current fuzzy output value stored in data buffer 40 is provided to B-Input multiplexor 56 at a point in time determined in accordance with the timing signals transferred via Micro-ROM Control Bus 65. B-Input control circuit 54 provides the Control B signal to control operation of B-Input multiplexor 56. In this example, the Control B signal allows B-Input multiplexor to pass an unmodified fuzzy output value from internal memory 32 to ALU 52. Similarly, A-Input control circuit 48 provides the Control A signal to A-Input multiplexor 50. The Control A signal enables A-Input multiplexor 50 to negate the contents of accumulator 58 for a subsequent subtraction operation in ALU 52.

Upon receipt of the values from both A-Input multiplexor 50 and B-Input multiplexor 56, ALU 52 subtracts the resulting rule strength value stored in accumulator 58 from the fuzzy output value stored at a predetermined memory location corresponding to the first fuzzy output of Rule 1. In the example described herein, the value stored in accumulator 58 has a hexadecimal value of $00. Because each of the fuzzy outputs of Rule 1 is assigned a hexadecimal value of $00, the result provided by ALU 52 is $00. Because the answer is not a negative number, the N signal remains negated and is subsequently provided to register swap logic 46.

As was previously discussed, condition code register 60 provides the $V_{CCR}$ signal to register swap logic 46. Additionally, the Timing Control signal is provided by an external source, timing circuit 28, to register swap logic 46. Upon receipt of each of the $V_{CCR}$, N, and Timing Control signals, register swap logic 46 negates both the Enable A and Enable B signals. Therefore, selectors 42 and 44 are respectively not enabled and do not allow a transfer of data between data buffer 40 and accumulator 58. Accordingly, the rule strength of the first fuzzy output in internal memory 32 is not modified and continues to have a hexadecimal value of $00.

Similarly, during determination of a rule strength for the second fuzzy output of Rule 1, both the value stored in accumulator 58 and the rule strength value retrieved from internal memory 32 have a hexadecimal value of $00. Therefore, ALU 52 again negates the N signal and register swap logic 46 is subsequently enabled to negate both the Enable A and Enable B signals. Therefore, after evaluation of Rule 1, the rule strength of each of the specified fuzzy outputs, Action 1 and Action 2, has a hexadecimal value of $00.

Again, at the end of the memory locations of the fuzzy outputs for Rule 1, a buffer address is recognized by comparator 72. Comparator 72 provides an asserted Toggle signal to condition code logic circuit 47. Condition code logic circuit 47 provides the Condition Code signal to condition code register such that the V bit in condition code register 60 is toggled to provide a negated $V_{CCR}$ signal. As was previously explained, the $V_{CCR}$ signal is negated to indicate that an address of a fuzzy input of Rule 2 is the next address to be retrieved from internal memory 32. In the example described herein, the $V_{CCR}$ signal is negated during execution of the "if" portion of the REVW instruction when the addresses of the fuzzy inputs for Rule 2 are retrieved from internal memory 32. When the $V_{CCR}$ signal is negated, the contents of accumulator 58 are again initialized to a value of $FF.

Continuing execution of the REVW instruction requires evaluation of Rule 2. As was previously explained, control unit 20 provides a series of sequencing control signals necessary to transfer each of the fuzzy inputs of Rule 2 from internal memory 32 to execution unit 14. During evaluation of Rule 2, internal memory 32 provides a first address where a degree of membership of the first system input in the warm temperature membership set is stored therein. In the example described herein, the address would point to hexadecimal address $1002 in internal memory 32. When address $1002 is accessed from internal memory 32, a degree of membership with a hexadecimal value of $CC is provided to data buffer 40 via Internal Data bus 34.

As during evaluation of Rule 1, the first fuzzy input of Rule 2 is compared to the initialized contents of accumulator 58. Accumulator 58 is again initialized to a hexadecimal value of $FF when the second buffer address was recognized. Therefore, the minimum value is detected in accordance with the method previously described and a $CC is stored in accumulator 58.

Similarly, the second fuzzy input of Rule 2 is provided to data buffer 40 from memory at an address in address buffer 45. The second fuzzy input is the degree of membership the second system input has in the medium pressure membership set. In this example, the degree of membership has a hexadecimal value of $FF.

To determine a minimum degree of membership, ALU 52 subtracts the first fuzzy input from the second fuzzy input to provide a result of a positive $33. Because the result is positive, the N flag is cleared and a negated N signal is provided via Results bus 120.

Subsequently, register swap logic 46 receives the $V_{CCR}$ signal, N signal, and the Timing Control signal to control switching of the contents of accumulator 58 and data buffer 40. Register swap logic 46 negates both the Enable A and Enable B signals, the minimum degree of membership, a hexadecimal value of $CC, remains stored in accumulator 58.

At the end of the memory locations of the fuzzy inputs for Rule 2, a buffer address is recognized by comparator 72. Comparator 72 provides an asserted Toggle signal to condition code logic circuit 47. Condition code logic circuit 47 then provides the Condition Code signal to condition code register 60 such that the V bit in condition code register 60 is toggled to provide an asserted $V_{CCR}$ signal. As was previously explained, the $V_{CCR}$ signal is negated to indicate that an address of a fuzzy output of Rule 2 is the next address to be retrieved from internal memory 32. If the $C_{CCR}$ signal is asserted, then the contents of accumulator 58 are modified by a weight value obtained from memory at an address set out in address buffer 45 from Index Register Y 53. The result is stored back in accumulator 58.

The strength value of Rule 2 remains in accumulator 58. Suppose that the resulting value in accumulator 58 is $66. The fuzzy outputs of the rule currently being evaluated are then provided from the rule array. The index register in execution unit 14 increments the pointer to point to an address of the first fuzzy output. In this example, the pointer is incremented to address $E012. At address $E012, an address of the first fuzzy output, hexadecimal address $2002, is provided. Because the user of data processing system 10 assigns all data values stored in the fuzzy output array a hexadecimal value of $00 prior to execution of the REVW instruction, internal memory 32 provides a hexadecimal value of $00 when address $2002 is accessed. The value of the fuzzy output ($00) is then provided to data buffer 40 via External Information bus 41 where the fuzzy output value is stored for subsequent operations.

ALU 52 then subtracts the hexadecimal value of $66 stored in accumulator 58 from the hexadecimal value of $00 stored in data buffer 40. A result is a negative $66 value and the N signal is asserted. When each of the N, $V_{CCR}$, and Timing signals are provided to register swap logic 46, register swap logic 46 asserts the Enable A signal and negates the Enable B signal.

When the Enable A signal is asserted, selector 42 is enabled to drive the contents of accumulator 58 to data buffer 40. Data buffer 40 temporarily stores the previous rule strength value ($66) provided by accumulator 58 as a maximum rule strength value. Additionally, data buffer 40 transfers the maximum rule strength value to the address location ($2002) of the first fuzzy output of Rule 2. Therefore, a value of $66 is the current rule strength value of Action 3 at address $2002 in internal memory 32 at this point during execution of the REVW instruction.

Again, at the end of the memory locations of the fuzzy outputs for Rule 2, a buffer address is recognized by comparator 72. Comparator 72 provides an asserted Toggle signal to condition code logic circuit 47. Condition code logic circuit 47 provides the Condition Code signal to condition code register such that the V bit in condition code register 60 is toggled to provide a negated $V_{CCR}$ signal. As was previously explained, the $V_{CCR}$ signal is negated to indicate that an address of a fuzzy input of Rule 3 is the next address to be retrieved from internal memory 32. In the example described herein, the $V_{CCR}$ signal is negated during execution of the "if" portion of the REVW instruction when the addresses of the fuzzy inputs for Rule 3 are retrieved from internal memory 32. When the $V_{CCR}$ signal is negated, the contents of accumulator 58 are again initialized to a value of $FF.

Continuing execution of the REVW instruction begins evaluating of Rule 3. As was previously explained, control unit 20 of CPU 12 provides a series of sequencing control signals necessary to transfer each of the fuzzy inputs of Rule 3 from internal memory 32 to execution unit 14. During evaluation of Rule 3, internal memory 32 provides a first address where a degree of membership of the second system input in the medium pressure membership set is stored therein. In the example described herein, the address would point to hexadecimal address $1005 in internal memory 32. When address $1005 is accessed from internal memory 32, a degree of membership with a hexadecimal value of $FF is provided to data buffer 40 via Internal Data bus 34.

As was previously mentioned, the contents of accumulator 58 are initialized to $FF when the $V_{CCR}$ signal is negated. When the degree of membership stored in data buffer 40 is subtracted from the contents of accumulator 58 by ALU 52, a result of zero is produced. Because the result is not negative, the N signal is not asserted. Therefore, register swap logic 46 does not assert either the Enable A or Enable B signals and information is not transferred between data buffer 40 and accumulator 58.

At the end of the memory location of the fuzzy input of Rule 3, a buffer address is recognized by comparator 72. Comparator 72 provides an asserted Toggle signal to condition code logic circuit 47. Condition code logic circuit 47 then provides the Condition Code signal to condition code register 60 such that the V bit in condition code register 60 is toggled to provide an asserted $V_{CCR}$ signal. As was previously explained, the $V_{CCR}$ signal is asserted to indicate that an address of a fuzzy output of Rule 3 is the next address to be retrieved from internal memory 32. At this point, a fetched weight value is multiplied by the contents of accumulator 58 to provide a weighted output.

Subsequently, the address of the fuzzy output of Rule 3 is accessed from internal memory 32 and a hexadecimal value of $66 is provided to data buffer 40. The hexadecimal value of $66 is provided as a result of evaluation of Rule 2 in which the fuzzy output, Action 3, was assigned a rule strength value of hexadecimal $66. Therefore, hexadecimal value $66 is provided to data buffer 40.

ALU 52 then subtracts the hexadecimal value of $FF stored in accumulator 58 from the hexadecimal value of $66 stored in data buffer 40. A result is a negative $–99 value. When provided to register swap logic 46, register swap logic 46 asserts the Enable A. Therefore, selector 42 is enabled to communicate data from accumulator 58 to data buffer 40. Data buffer 40 transfers the minimum degree of membership value to the address location of the fuzzy output of Rule 3, the Action 3 output. Therefore, a hexadecimal value of $FF is the current rule strength value of Action 3 at this point during execution of the REVW instruction.

After evaluation of Rule 3, a special buffer address indicating an end of the array of rules to be evaluated is detected by comparator 72 and the REVW instruction is terminated. At that point, each of Rules 1, 2, and 3 has been evaluated and each of the corresponding fuzzy outputs has been assigned a rule strength value. In the example described herein, each of Actions 1 and 2 has been assigned a rule strength value of hexadecimal $00. Additionally, Action 3 has been assigned a rule strength value of hexadecimal $FF. Each of the Actions is then provided as a fuzzy output to a defuzzification routine to be used to determine appropriate actions for data processing system 10. For example, Action 3 may be defuzzified to open a valve or to turn on a fan. Additionally, the rule strength of Actions 1 through 3 may be defuzzified to determine a degree to which a fan is turned on or a valve is opened. The defuzzification operation is well known in the data processing art and, therefore, is not explained in detail herein.

Therefore, during execution of the REVW instruction in data processing system 10, each of Rule 1, Rule 2, and Rule 3 were evaluated quickly and with a minor amount of added circuitry. Most of the circuitry shown in FIG. 3 is generally used to perform general purpose processing in a data processor. A small amount of additional memory in the Micro-ROM and a small amount of added instruction decode logic is required to implement the present invention. Additionally, in execution unit 14, comparator 72 and register switch logic circuit 46 are required in addition to logic traditionally required.

Because the entire rule evaluation step is processed completely during execution of the REVW instruction, a faster execution time may be achieved. In previous implementations of the rule evaluation step, a software program with numerous steps was required. For example, a software program implemented using the MC68HC11 instruction set typically requires thirty instructions to perform the rule evaluation step. The REVW instruction replaces all thirty-one instructions of the MC68HC11 program. Therefore, the execution time typically required to execute the rule evaluation step is significantly reduced by the implementation of a single REVW instruction.

Additionally, the REVW instruction is very flexible and does not require a fixed number of fuzzy inputs or fuzzy outputs. By detecting the buffer addresses and setting the $V_{CCR}$ signal accordingly, execution unit 14 provides either a maximum or a minimum value of the fuzzy outputs and fuzzy inputs, respectively. The user of data processing system 10 is only required to store the format for the rules to be evaluated at a predetermined location in internal memory 32. In prior art solutions in which the rules are stored in a predetermined memory location, the rules must follow a fixed format with a first predetermined number of fuzzy inputs and a second predetermined number of fuzzy outputs per rule. If the buffer addresses were not detected and a fixed number of fuzzy inputs and fuzzy outputs were required for each rule, a great deal of memory would be wasted for those rules which had fewer fuzzy inputs or fuzzy outputs.

As well, because the rules are stored in an array in memory which may be evaluated without interruptions from external sources, more than one rule may be evaluated for each REVW instruction. After a first rule is evaluated, a second rule may be immediately evaluated without retrieval of additional information from the user of data processing system 10. Rules may be retrieved until an end of the array is reached. The end of the array is indicated by a special buffer address. During execution of the rule evaluation step in previous implementations, each rule was evaluated separately. Therefore, the time necessary to evaluate a plurality of rules using previous software techniques is longer than the time necessary to evaluate the same plurality of rules using the REVW instruction.

In the implementation of the invention described herein, execution of the REVW instruction may be interrupted without losing any intermediate results. After the interrupt has been processed, execution of the REVW instruction may be resumed at the point at which the REVW instruction was interrupted. The REVW instruction may be interrupted because the pointer to the rule array in internal memory 32 is stored in an index register which is saved during an interrupt. Additionally, the state of the $V_{CCR}$ bit is not modified during the interrupt because it is stored in condition code register 60, a processor status register which is not changed during the interrupt operation. Intermediate results of the minimum and maximum operations are also stored in accumulator 58. Again, accumulator 58 is not modified during the interrupt operation. Therefore, even though the REVW instruction may be time consuming when processing a large number of rules, the instruction may be interrupted by the user of data processing system 10 such that more urgent operations may be performed. Execution of the REVW instruction is then resumed when the more urgent operations are complete.

The implementation of the invention described herein is provided by way of example only. However, many other implementations may exist for executing the function described herein. For example, the start of the rule base of the rules to be evaluated may be provided as an operand of the REVW instruction. Additionally, a memory circuit external to data processing system 10 may be used to store each of the rules and the fuzzy inputs used during evaluation of the rules. As well, although the N and $V_{CCR}$ signals were used to control operation of register swap logic 46 in this implementation of the invention, and the $C_{CCR}$ signal was used to control the weighting operations, other signals within data processing system 10 may be easily adapted for use. Additionally, the logic gates used in register swap logic 46 may also be replaced with other logic circuits such as NAND, OR, NOR, or Exclusive-OR gates.

While there have been described herein the principles of the invention, it is to be clearly understood to those skilled in the art that this description is made only by way of example and not as a limitation to the scope of the invention. For example, the REVW instruction may be performed entirely within the CPU or by a both the CPU and a co-processor. In the latter case, the CPU would be considered to include the instruction decoder and the co-processor would be considered to include the execution unit. Accordingly, it is intended, by the appended claims, to cover all modifications of the invention which fall within the true spirit and scope of the invention.

I claim:

1. A data processing system for evaluating fuzzy logic rules, comprising;
   (a) an instruction decoder having an input for receiving a rule evaluation instruction, the rule evaluation instruction to be processed from an instruction set comprising a plurality of instructions, and having an output;
   (b) a register having an output for providing a control signal; and
   (c) an execution unit having a first input coupled to the output of the instruction decoder and a second input for receiving the control signal, for executing a plurality of arithmetic and logic functions in response to a plurality of input signals from the output of the instruction decoder, and in response to the rule evaluation instruction, the execution unit fetching at least one fuzzy input of a fuzzy logic rule, determining a rule strength by performing a predetermined mathematical operation on the at least one fuzzy input, and selectively weighting the rule strength to provide a fuzzy output in response to a logic state of the control signal.

2. The data processing system of claim 1 wherein the predetermined mathematical operation comprises determining a minimum one of the at least one fuzzy input.

3. The data processing system of claim 2 wherein the execution unit further comprises an arithmetic logic unit having a first input for receiving the minimum one of the at least one fuzzy input, a second input for receiving a weight, and an output for providing the fuzzy output.

4. The data processing system of claim 1 wherein the register comprises a condition code register and wherein the execution unit performs the predetermined mathematical operation if a selected bit in the condition code register is in a predetermined state.

5. The data processing system of claim 1 further comprising a memory for storing a weight corresponding to the fuzzy logic rule.

6. The data processing system of claim 1 wherein the execution unit further provides a second fuzzy output by performing a second predetermined mathematical operation between the fuzzy output and a prior second fuzzy output.

7. The data processing system of claim 6 wherein the second predetermined mathematical operation comprises determining a maximum one of the fuzzy output and the prior second fuzzy output.

8. A data processing system for evaluating fuzzy logic rules, comprising:
   (a) an instruction decoder having an input for receiving a rule evaluation instruction, the rule evaluation instruction to be processed from an instruction set comprising a plurality of instructions, and having an output; and
   (b) an execution unit for executing a plurality of arithmetic and logic functions in response to a plurality of input signals from the output of the instruction decoder, the execution unit fetching at least one fuzzy input of a fuzzy logic rule, determining a rule strength by performing a predetermined mathematical operation on the at least one fuzzy input, and selectively weighting the rule strength to provide a fuzzy output in response to a logic state of a control signal, wherein the execution unit comprises first and second index registers, the execution unit retrieving at least one corresponding address for fetching the at least one fuzzy input using the first index register, and fetching a weight using the second index register.

9. A data processing system for evaluating fuzzy logic rules, comprising:
   an instruction decoder having an input for receiving an instruction of a plurality of instructions including a rule evaluation instruction, and an output for providing a plurality of control signals in response to the instruction; and
   an execution unit coupled to an information bus and having a control input coupled to the output of the instruction decoder;
   the execution unit further comprising a register having an output for providing a predetermined control signal;
   the instruction decoder controlling the execution unit to store a value in the register in response to an instruction other than the rule evaluation instruction;
   the instruction decoder controlling the execution unit to cause the execution unit to fetch a plurality of fuzzy inputs via the information bus in response to the rule evaluation instruction;
   the instruction decoder further controlling the execution unit to determine a minimum one of the plurality of fuzzy inputs and selectively weighting the minimum one of the plurality of fuzzy inputs to provide a fuzzy output in response to a logic state of the predetermined control signal.

10. The data processing system of claim 9 wherein the register comprises a condition code register and wherein the execution unit selectively weights the minimum one of the plurality of fuzzy inputs if a selected bit in the condition code register is in a predetermined state.

11. The data processing system of claim 9 wherein the data processing system is characterized as being an integrated circuit microcontroller having a memory.

12. The data processing system of claim 11 wherein the instruction decoder and the execution unit form a central processing unit of the integrated circuit microcontroller.

13. The data processing system of claim 9 wherein the execution unit comprises first and second index registers, the execution unit retrieving corresponding addresses for fetching the plurality of fuzzy inputs using the first index register, and fetching a weight using the second index register.

14. The data processing system of claim 9 wherein the execution unit further comprises an arithmetic logic unit having a first input for receiving the minimum one of the plurality of fuzzy inputs, a second input for receiving a weight, and an output for providing the fuzzy output.

15. In a data processing system, a method for evaluating fuzzy logic rules, comprising the steps of:
   (a) performing a predetermined mathematical operation on a plurality of fuzzy inputs associated with a fuzzy logic rule to provide an unweighted output;
   (b) examining a control bit in a condition code register of the data processing system to determine whether the fuzzy logic rule is to be weighted; and
   (c) fetching a weight corresponding to the fuzzy logic rule and weighting the fuzzy logic rule by multiplying the unweighted output by the weight to provide a fuzzy output, in response to the control bit being in a predetermined state.

16. The method of claim 15 further comprising the step of repeating the steps (a)-(c) for each of a plurality of fuzzy logic rules in a rule base.

17. The method of claim 15 further wherein the step of performing the predetermined mathematical operation on the plurality of fuzzy inputs comprises the step of determining a minimum one of the plurality of fuzzy inputs.

18. The method of claim 17 wherein the step of weighting the fuzzy logic rule comprises the steps of:
   providing the minimum one of the plurality of fuzzy inputs to a first input of an arithmetic logic unit;
   providing the weight to a second input of the arithmetic logic unit; and
   activating the arithmetic logic unit to perform a multiplication; and
   providing an output of the arithmetic logic unit as the fuzzy output.

19. The method of claim 15 further comprising the step of providing a second fuzzy output by performing a second predetermined mathematical operation between the fuzzy output and a prior second fuzzy output.

20. The method of claim 19 wherein the step of providing the second fuzzy output comprises the step of providing the second fuzzy output by determining a maximum of the fuzzy output and the prior second fuzzy output.

21. The method of claim 15 wherein the step of examining the control bit in the condition code register comprises the step of examining a carry bit in the condition code register.

22. In a data processing system, a method for evaluating fuzzy logic rules, comprising the steps of:

storing a value in a register which indicates whether a rule evaluation instruction is to be weighted or unweighted;

receiving a rule evaluation instruction and in response to receiving the rule evaluation instruction, performing the steps of:

(a) performing a predetermined mathematical operation on a plurality of fuzzy inputs associated with a fuzzy logic rule to provide an unweighted output;

(b) determining whether the fuzzy logic rule is to be weighted by examining the value in the register, and if the fuzzy logic rule is to be weighted, performing the steps of:

(c) fetching a weight using an index register; and (d) weighting the fuzzy logic rule by multiplying the unweighted output by the weight to provide a fuzzy output.

23. The method of claim 22 further comprising the step of repeating the steps (a)–(d) for each of a plurality of fuzzy logic rules in a rule base.

24. The method of claim 22 further wherein the step of performing a predetermined mathematical operation on the plurality of fuzzy inputs comprises the step of determining a minimum one of the plurality of fuzzy inputs.

25. The method of claim 22 wherein the step of weighting the fuzzy logic rule comprises the steps of:

providing the unweighted output to a first input of an arithmetic logic unit;

providing the weight to a second input of the arithmetic logic unit; and activating the arithmetic logic unit to perform a multiplication; and providing an output of the arithmetic logic unit as the fuzzy output.

26. The method of claim 22 further comprising the step of providing a second fuzzy output by performing a second predetermined mathematical operation between the fuzzy output and a prior second fuzzy output.

27. The method of claim 26 wherein the step of providing the second fuzzy output comprises the step of providing the second fuzzy output by determining a maximum of the fuzzy output and the prior second fuzzy output.

28. In a data processing system, a method for evaluating fuzzy logic rules, comprising the steps of:

receiving a rule evaluation instruction and in response to receiving the rule evaluation instruction, performing the steps of:

(a) reading a rule operand from a table using a table address;

(b) incrementing the table address;

(c) fetching a data value using the rule operand;

(d) fetching a subsequent value using the table address, incrementing the table address, and updating the rule operand with the subsequent value;

(e) providing an output by performing a predetermined mathematical operation between the data value and a prior output;

(f) repeating steps (c)–(e) and performing the predetermined mathematical operation as a minimum function until the rule operand is equal to a first predetermined buffer value;

(g) fetching a weight using an index register and incrementing the index register;

(h) repeating step (d);

(i) multiplying the output by the weight to provide a result and updating the output with the result; and (j) repeating steps (c)–(e) and performing the predetermined mathematical operation as a maximum function;

(k) repeating step (j) until the rule operand is equal to either the first predetermined buffer value or a second predetermined buffer value;

(l) repeating steps (c)–(k) while the rule operand is not equal to the second predetermined buffer value.

29. The method of claim 28 further comprising the step of performing steps (a)–(l) in response to the data processing system decoding a rule evaluation weighted instruction.

30. The method of claim 28 further comprising the step of performing steps (b) and (d) using a second index register.

31. The method of claim 28 further comprising the step of performing steps (e) and (i) using an arithmetic logic unit.

32. In a data processing system, a method for evaluating fuzzy logic rules, comprising the steps of:

(a) setting a first status bit to a first logic state;

(b) reading a rule operand from a rule base table using a first index register;

(c) incrementing a value of the first index register;

(d) if the rule operand is equal to a first predetermined buffer value, performing the steps of:

(i) toggling the first status bit;

(ii) if the first status bit is not in the first logic state, checking a second status bit, and if the second status bit is in a second logic state, performing the steps of:

(1) using a second index register to fetch a rule weight;

(2) incrementing a value of the second index register;

(3) using the first index register to fetch a rule operand;

(4) incrementing a value of the first index register;

(5) multiplying the rule weight by the value of an accumulator, and storing a result of the step of multiplying in the accumulator;

(iii) if the first status bit is in the first logic state, setting the accumulator to a maximum value thereof;

(e) if the rule operand is not equal to either the first predetermined buffer value or a second predetermined buffer value, performing the steps of:

(i) fetching a data element using the rule operand;

(ii) fetching a subsequent value using the first index register and updating the rule operand with the subsequent value;

(iii) incrementing the value in the first index register;

(iv) comparing the data element with a value of the accumulator and setting a third status bit to a third logic state if the data element is less than the value of the accumulator;

(v) replacing the value of the accumulator with the data element if the first status bit is in the first logic state and the third status bit is in the third logic state; and (vi) storing the value of the accumulator in memory using the rule operand if the first status bit is in the first logic state and the third status bit is not in the third logic state;

(f) repeating steps (d) and (e) while the rule operand is not equal to the second predetermined buffer value.

33. The method of claim 32 further comprising the step of performing steps (b) through (f) in response to a rule evaluation instruction.

34. A method for performing efficient fuzzy logic operations in a data processing system, comprising the steps of:

(a) storing a control signal in a register;

(b) decoding a rule evaluation instruction subsequent to said step of storing, wherein the rule evaluation instruction may be unweighted or weighted selectively in response to a logic state of said control signal;

(b) if the control signal indicates that the rule evaluation instruction is unweighted, determining a minimum one of at least one fuzzy input for each of a plurality of rules in a rule base, and then determining a maximum one of said minimum one of each of said plurality of rules in said rule base to provide as an output; and (c) if the control signal indicates that the rule evaluation instruction is weighted, determining a minimum one of at least one fuzzy input and weighting the minimum one using a corresponding weight to provide a weighted minimum, for each of a plurality of rules in the rule base, and then determining a maximum one of said weighted minimum of each of the plurality of rules in the rule base to provide as an output.

* * * * *